US012608673B2

(12) United States Patent
Miyata et al.

(10) Patent No.:  US 12,608,673 B2
(45) Date of Patent:  Apr. 21, 2026

(54) LOGISTICS NETWORK MANAGEMENT DEVICE, LOGISTICS NETWORK MANAGEMENT SYSTEM, AND LOGISTICS NETWORK MANAGEMENT METHOD

(71) Applicant: Hitachi, Ltd., Tokyo (JP)

(72) Inventors: Kohei Miyata, Tokyo (JP); Satoshi Nagahara, Tokyo (JP); Norisuke Fujii, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 371 days.

(21) Appl. No.: 18/025,149

(22) PCT Filed: Aug. 19, 2021

(86) PCT No.: PCT/JP2021/030425
§ 371 (c)(1),
(2) Date: Mar. 7, 2023

(87) PCT Pub. No.: WO2022/102194
PCT Pub. Date: May 19, 2022

(65) Prior Publication Data
US 2023/0325958 A1      Oct. 12, 2023

(30) Foreign Application Priority Data

Nov. 12, 2020     (JP) ................................. 2020-188556

(51) Int. Cl.
*G06Q 10/00*          (2026.01)
*G06Q 10/08*          (2023.01)
*G06Q 10/109*         (2023.01)
(52) U.S. Cl.
CPC ......... *G06Q 10/08* (2013.01); *G06Q 10/1097* (2013.01)
(58) Field of Classification Search
None
See application file for complete search history.

(56) References Cited

U.S. PATENT DOCUMENTS 8,655,736 B2 *   2/2014   Bharadwaj ......... G06Q 30/0603
                                                705/26.1
2005/0021225 A1 *   1/2005   Kantarjiev ........... G08G 1/0116
                                                701/119
(Continued)

FOREIGN PATENT DOCUMENTS

JP        2019-133667 A       8/2019
JP        2019-215643 A      12/2019

OTHER PUBLICATIONS

Su, Shi, Recent Advances in Nanocarrier-Assisted Therapeutics Delivery Systems, 2020, Pharmaceutics, Pharmaceutics 2020, 12, 837; doi:10.3390/pharmaceutics 12090837. p. 1-25. (Year: 2020).*

(Continued)

*Primary Examiner* — Joseph M Waesco
(74) *Attorney, Agent, or Firm* — Crowell & Moring LLP

(57)          ABSTRACT

This logistics network management device 1100: calculates, for each vehicle 1300, based on the expected arrival time at a delivery destination location at which the vehicle will arrive after an expected arrival at a delivery origin location and also based on information about vacant period of each shared unit 1210 at the delivery destination location, a recommended arrival time, which is the arrival time at the delivery destination location for which the period from arrival at the delivery destination location until the start of a prescribed operation is shortest; calculates a recommended departure time from the delivery origin location; and, for each vehicle 1300, when the vehicle 1300 can arrive at a shared unit 1210 that can be used at the delivery origin location at a time at or before the recommended departure time, displays information indicating that the vehicle 1300 should arrive at the stated time at the shared unit 1210 that can be used at the delivery origin location.

15 Claims, 13 Drawing Sheets

(56) References Cited

U.S. PATENT DOCUMENTS

| | | | | |
|---|---|---|---|---|
| 2012/0041675 A1* | 2/2012 | Juliver | ................... | G06Q 10/08 |
| | | | | 701/465 |
| 2015/0371157 A1* | 12/2015 | Jaffe | ...................... | G06Q 50/40 |
| | | | | 705/6 |
| 2016/0114800 A1* | 4/2016 | Shimizu | .......... | B60W 30/18027 |
| | | | | 701/70 |
| 2017/0039666 A1* | 2/2017 | Kuersten | ............ | G06Q 30/0251 |
| 2018/0053149 A1* | 2/2018 | Sarrapy | .............. | G06Q 10/0834 |
| 2018/0060812 A1* | 3/2018 | Robinson | ........... | G07C 9/00912 |
| 2019/0052728 A1* | 2/2019 | Cheng | ..................... | H04L 67/62 |
| 2019/0220827 A1* | 7/2019 | Cogill | ............. | G06Q 10/06316 |
| 2019/0279625 A1* | 9/2019 | Huang | .................. | G06F 3/0484 |
| 2019/0311307 A1* | 10/2019 | Ramot | .................. | G06Q 10/06 |
| 2020/0193996 A1* | 6/2020 | Huang | .............. | G06Q 30/0261 |
| 2020/0242583 A1* | 7/2020 | Sawyer | ................ | G06Q 20/127 |
| 2020/0322451 A1* | 10/2020 | Cheng | .................... | H04L 67/62 |
| 2023/0186275 A1* | 6/2023 | Sawyer | ............. | G01C 21/3476 |
| | | | | 705/14.1 |

OTHER PUBLICATIONS

International Search Report (PCT/ISA/210) issued in PCT Application No. PCT/JP2021/030425 dated Oct. 12, 2021 with English translation (four (4) pages).

Japanese-language Written Opinion (PCT/ISA/237) issued in PCT Application No. PCT/JP2021/030425 dated Oct. 12, 2021 (three (3) pages).

* cited by examiner

~100

LOGISTICS NETWORK MANAGEMENT SYSTEM ~1100

~1110 LOGISTICS NETWORK MANAGEMENT DEVICE

~1111 STORAGE DEVICE ~1121

| | |
|---|---|
| DELIVERY PLAN INFORMATION ~1111 | SHARED UNIT UNASSIGNED VEHICLE GENERATION UNIT ~1121 |
| SHARED UNIT USAGE TIME BAND INFORMATION ~1112 | RECOMMENDED DEPARTURE TIME CALCULATION UNIT ~1122 |
| INTER-LOCATION MOVEMENT TIME INFORMATION ~1113 | SHARED UNIT USAGE TIME BAND GENERATION UNIT ~1123 |
| EXPECTED ARRIVAL TIME INFORMATION ~1114 | SHARED UNIT USAGE INSTRUCTION GENERATION UNIT ~1124 |
| RECOMMENDED DEPARTURE TIME INFORMATION ~1115 | INPUT UNIT ~1125 |
| SHARED UNIT USAGE TIME BAND UPDATE PROPOSAL INFORMATION ~1116 | OUTPUT UNIT ~1126 |
| SHIPPING PREPARATION PROGRESS INFORMATION ~1117 | |

| | |
|---|---|
| COMPUTATION DEVICE ~1120 | OUTPUT DEVICE ~1140 |
| INPUT DEVICE ~1130 | COMMUNICATION DEVICE ~1150 |

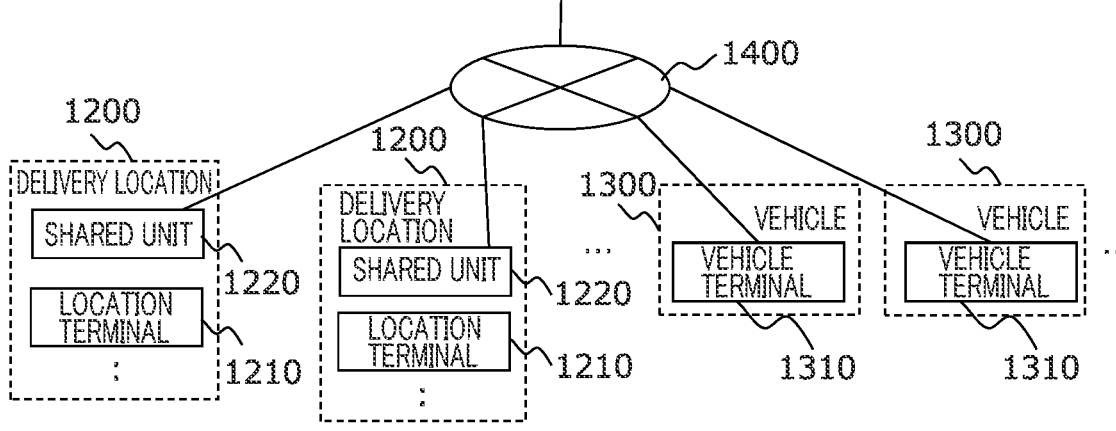

FIG. 1

DELIVERY PLAN INFORMATION 1111

~1111a     ~1111b    ~1111c

| VEHICLE ID | LOCATION ID | DELIVERY ORDER |
|------------|-------------|----------------|
| TRUCK A | WAREHOUSE 1 | 1 |
| TRUCK A | WAREHOUSE 2 | 2 |
| TRUCK A | WAREHOUSE 3 | 3 |
| TRUCK B | WAREHOUSE 1 | 1 |
| TRUCK B | WAREHOUSE 3 | 2 |
| TRUCK C | WAREHOUSE 1 | 1 |
| TRUCK C | WAREHOUSE 4 | 2 |
| : | : | : |

SHARED UNIT USAGE TIME BAND INFORMATION 1112

| VEHICLE ID | LOCATION ID | SHARED UNIT | USAGE START TIME | USAGE END TIME |
|------------|-------------|-------------|------------------|----------------|
| TRUCK A | WAREHOUSE 1 | BERTH a | 8/1 9:00 | 8/1 10:00 |
| TRUCK B | WAREHOUSE 1 | BERTH b | 8/1 10:00 | 8/1 11:00 |
| TRUCK C | WAREHOUSE 1 | BERTH a | 8/1 10:00 | 8/1 11:00 |
| TRUCK A | WAREHOUSE 2 | BERTH c | 8/1 19:00 | 8/1 20:00 |
| TRUCK B | WAREHOUSE 3 | BERTH d | 8/1 20:00 | 8/1 21:00 |
| — | WAREHOUSE 3 | BERTH d | 8/1 0:00 | 8/1 20:00 |
| TRUCK C | WAREHOUSE 4 | BERTH e | 8/1 20:00 | 8/1 21:00 |
| TRUCK D | WAREHOUSE 3 | BERTH d | 8/1 19:00 | 8/1 20:00 |
| : | : | : | : | : |

INTER-LOCATION MOVEMENT TIME INFORMATION 1113

| DELIVERY ORIGIN LOCATION ID | DELIVERY DESTINATION LOCATION ID | MOVEMENT TIME |
|---|---|---|
| WAREHOUSE 1 | WAREHOUSE 2 | 9 HOURS |
| WAREHOUSE 1 | WAREHOUSE 3 | 9 HOURS |
| WAREHOUSE 1 | WAREHOUSE 4 | 9 HOURS |
| : | : | : |

EXPECTED ARRIVAL TIME INFORMATION 1114

| VEHICLE ID | LOCATION ID | PREDICTED ARRIVAL TIME |
|---|---|---|
| TRUCK A | WAREHOUSE 1 | 8/1 10:00 |
| TRUCK B | WAREHOUSE 1 | 8/1 9:00 |
| TRUCK C | WAREHOUSE 1 | 8/1 9:00 |
| : | : | : |

RECOMMENDED DEPARTURE TIME INFORMATION 1115

| VEHICLE ID | LOCATION ID | RECOMMENDED DEPARTURE TIME |
|---|---|---|
| TRUCK A | WAREHOUSE 1 | 8/1 10:00 |
| TRUCK B | WAREHOUSE 1 | 8/1 11:00 |
| TRUCK C | WAREHOUSE 1 | 8/1 10:00 |
| : | : | : |

SHARED UNIT USAGE TIME BAND UPDATE PROPOSAL INFORMATION 1116

| VEHICLE ID | LOCATION ID | SHARED UNIT | USAGE START TIME | USAGE END TIME |
|---|---|---|---|---|
| TRUCK A | WAREHOUSE 1 | BERTH a | 8/1 10:00 | 8/1 11:00 |
| TRUCK B | WAREHOUSE 1 | BERTH b | 8/1 10:00 | 8/1 11:00 |
| TRUCK C | WAREHOUSE 1 | BERTH a | 8/1 9:00 | 8/1 10:00 |
| TRUCK A | WAREHOUSE 2 | BERTH c | 8/1 20:00 | 8/1 21:00 |
| TRUCK C | WAREHOUSE 4 | BERTH e | 8/1 19:00 | 8/1 20:00 |
| : | : | : | : | : |

1116a  1116b  1116c  1116d  1116e

1116g

SHIPPING PREPARATION PROGRESS INFORMATION 1117

1117a    1117b    1117c

| VEHICLE ID | LOCATION ID | SHIPPING PREPARATION PREDICTED COMPLETION TIME |
|---|---|---|
| TRUCK A | WAREHOUSE 1 | 8/1 9:00 |
| TRUCK B | WAREHOUSE 1 | 8/1 9:00 |
| TRUCK C | WAREHOUSE 1 | 8/1 9:00 |
| : | : | : |

FIG. 8

SHARED UNIT ASSIGNMENT PROCESSING

SHARED UNIT UNASSIGNED VEHICLE GENERATION PROCESSING

RECOMMENDED DEPARTURE TIME CALCULATION PROCESSING

SHARED UNIT USAGE TIME BAND GENERATION UNIT

SHARED UNIT USAGE INSTRUCTION GENERATION PROCESSING

LOGISTICS NETWORK MANAGEMENT DEVICE, LOGISTICS NETWORK MANAGEMENT SYSTEM, AND LOGISTICS NETWORK MANAGEMENT METHOD

TECHNICAL FIELD

The present invention relates to a logistics network management device, a logistics network management system, and a logistics network management method.

BACKGROUND ART

Incorporation by Reference

This application claims the priority of Japanese Patent Application No. 2020-188556 filed on Nov. 12, 2020, the contents of which are incorporated herein by reference.

In recent years, the logistics industry has been faced with the problem of long cargo waiting time of vehicles that transport cargo via a plurality of delivery locations. This cargo waiting time is caused by the shortage of shared units (berths, forklifts, and the like) used for loading and unloading at the delivery locations in relation to the number of vehicles.

On the other hand, as a technique to reduce the cargo waiting time, Patent Literature 1 describes a technique for a truck driver to book a shared unit usage time band. Patent Literature 2 also describes a technique to make a delivery plan so as to utilize a time band when a shared unit is available.

CITATION LIST

Patent Literature

[PTL 1] Japanese Patent Application Publication No. 2019-133667
[PTL 2] Japanese Patent Application Publication No. 2019-215643

SUMMARY OF INVENTION

Technical Problem

In Patent Literature 1, when the arrival time of the vehicle is earlier or later than the initially booked shared unit usage time, the booked usage time band is manually adjusted. In this case, the driver or the like usually changes the usage order of the shared units in order of arrival of the vehicles, thereby reducing the cargo waiting time at the delivery location. However, even when the vehicle moved up in the usage order due to this change arrives at the subsequent delivery location, there will be no vacant shared unit at that delivery location until the initially booked time band, resulting in the possibility that cargo waiting time occurs at the delivery location.

In Patent Literature 2, when the vehicle arrives before or after the initially booked shared unit usage time, the cargo waiting time is reduced by replanning the delivery plan so as to utilize the vacant period of the shared unit at the subsequent delivery location. However, since this technique is to make a delivery plan for a single vehicle according to the convenience of the shared units of the delivery location, it is not possible to adjust the shared unit usage time band among a plurality of vehicles. Therefore, even if there is a vehicle desired to preferentially use the shared unit in consideration of the schedule of the delivery locations through which the vehicle passes among the plurality of delivery vehicles, it is not possible to adjust the shared unit usage time band accordingly, leading to a problem that the cargo waiting time cannot be reduced.

The present invention has been made in view of such circumstances, and an object of the present invention is to provide a logistics network management device, a logistics network management system, and a logistics network management method, capable of reducing standby time of each vehicle at a delivery location when a plurality of vehicles make deliveries via a plurality of delivery locations having a plurality of shared units.

An aspect of the present invention to solve the above object is a logistics network management device configured to manage a logistics network in which a plurality of vehicles make deliveries via a plurality of delivery locations having a plurality of shared units, comprising: a computation device configured to execute recommended departure time calculation processing of specifying, for each selected vehicle, based on an expected arrival time at a second delivery location at which the vehicle will arrive after an expected arrival at a first delivery location and also based on information about a vacant period of each shared unit at the second delivery location, a recommended arrival time that is an arrival time at the second delivery location for which a period from arrival at the second delivery location until the start of a predetermined operation is shortest, and calculating, based on the specified recommended arrival time, a recommended departure time that is a departure time from the first delivery location, shared unit usage time band generation processing of determining, for each vehicle, whether or not the vehicle can arrive at a shared unit that can be used at the first delivery location at a time at or before the calculated recommended departure time, and generating, when it is determined that the vehicle can arrive at the shared unit that can be used, information indicating that the vehicle should arrive at the stated time at the shared unit that can be used at the first delivery location, and usage instruction generation processing of displaying the generated information.

Another aspect of the present invention to solve the above object is a logistics network management system configured to manage a logistics network in which a plurality of vehicles make deliveries via a plurality of delivery locations having a plurality of shared units, comprising: a computation device configured to execute recommended departure time calculation processing of specifying, for each selected vehicle, based on an expected arrival time at a second delivery location at which the vehicle will arrive after an expected arrival at a first delivery location and also based on information about a vacant period of each shared unit at the second delivery location, a recommended arrival time that is an arrival time at the second delivery location for which a period from arrival at the second delivery location until the start of a predetermined operation is shortest, and calculating, based on the specified recommended arrival time, a recommended departure time that is a departure time from the first delivery location, shared unit usage time band generation processing of determining, for each vehicle, whether or not the vehicle can arrive at a shared unit that can be used at the first delivery location at a time at or before the calculated recommended departure time, and generating, when it is determined that the vehicle can arrive at the shared unit that can be used, information indicating that the vehicle should arrive at the stated time at the shared unit that can be used at the first delivery location, and usage instruction generation processing of displaying the generated information; a logistics network management device configured to transmit the generated information in the usage instruction generation processing; and a location terminal configured to display information received from the logistics network management device and provided at the first delivery location.

Another aspect of the present invention to solve the above object is a logistics network management method for managing a logistics network in which a plurality of vehicles make deliveries via a plurality of delivery locations having a plurality of shared units, wherein an information processing device executes recommended departure time calculation processing of specifying, for each selected vehicle, based on an expected arrival time at a second delivery location at which the vehicle will arrive after an expected arrival at a first delivery location and also based on information about a vacant period of each shared unit at the second delivery location, a recommended arrival time that is an arrival time at the second delivery location for which a period from arrival at the second delivery location until the start of a predetermined operation is shortest, and calculating, based on the specified recommended arrival time, a recommended departure time that is a departure time from the first delivery location, shared unit usage time band generation processing of determining, for each vehicle, whether or not the vehicle can arrive at a shared unit that can be used at the first delivery location at a time at or before the calculated recommended departure time, and generating, when it is determined that the vehicle can arrive at the shared unit that can be used, information indicating that the vehicle should arrive at the stated time at the shared unit that can be used at the first delivery location, and usage instruction generation processing of displaying the generated information.

Advantageous Effects of Invention

According to the present invention, when a plurality of vehicles make deliveries via a plurality of delivery locations having a plurality of shared units, standby time of each vehicle at the delivery location can be reduced.

Problems, configurations, and effects other than those described above will be clarified by the following description of embodiments.

BRIEF DESCRIPTION OF DRAWINGS

FIG. 1 is a diagram showing a configuration example of a logistics network management system according to an embodiment.

FIG. 2 is a diagram showing an example of delivery plan information.

FIG. 3 is a diagram showing an example of shared unit usage time band information.

FIG. 4 is a diagram showing an example of inter-location movement time information.

FIG. 5 is a diagram showing an example of expected arrival time information.

FIG. 6 is a diagram showing an example of recommended departure time information.

FIG. 7 is a diagram showing an example of shared unit usage time band update proposal information.

FIG. 8 is a diagram showing an example of shipping preparation progress information.

DESCRIPTION OF EMBODIMENTS

Figure 9:
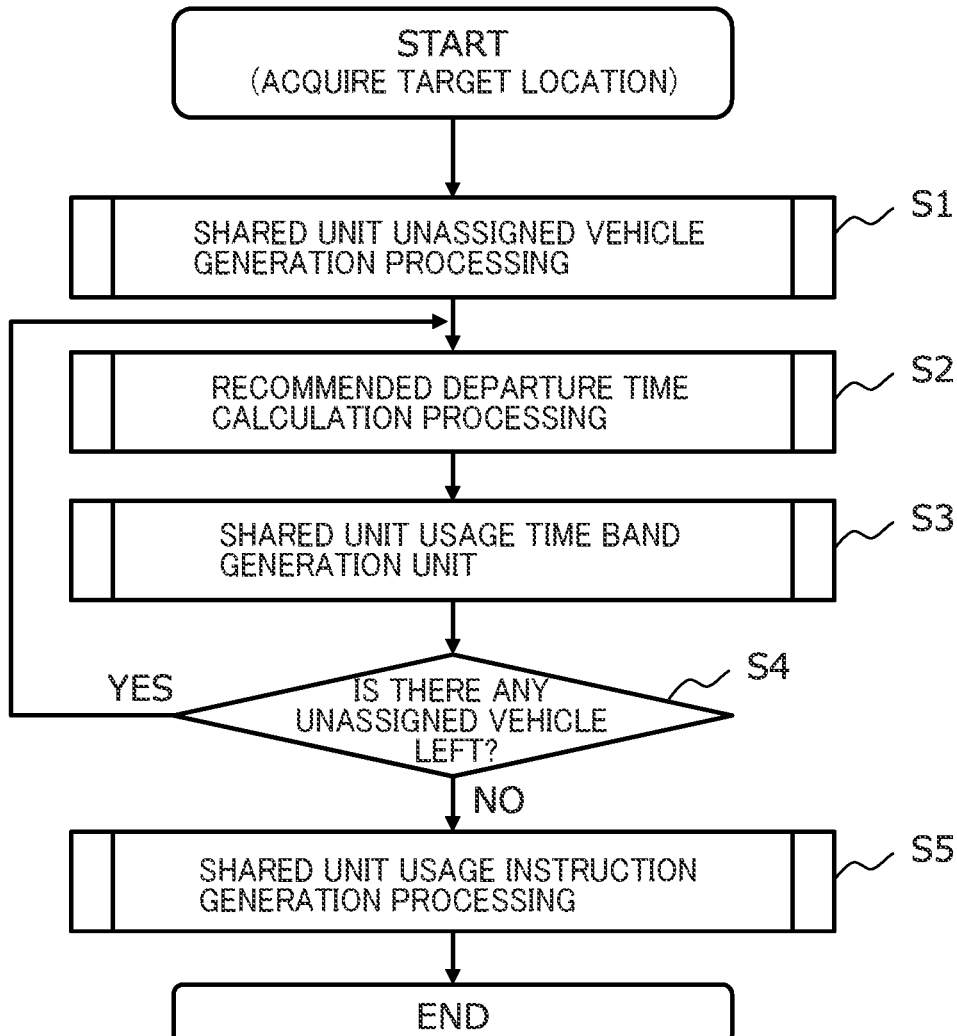
FIG. 9 is a flowchart illustrating an example of shared unit assignment processing.

Hereinafter, embodiments of the present invention will be described with reference to the drawings.

System Configuration

FIG. 1 is a diagram showing a configuration example of a logistics network management system 100 according to this embodiment. The logistics network management system 100 includes: a plurality of vehicles 1300 for delivering packages; a plurality of delivery locations 1200 where the packages are loaded to and unloaded from the vehicles 1300; and a logistics network management device 1100.

The vehicle 1300 includes a vehicle terminal 1310 that outputs predicted arrival time at each delivery location and receives berthing instruction information.

The delivery location 1200 includes: a plurality of shared units 1210 (parking areas) where the packages delivered by each vehicle 1300 can be loaded or unloaded; and a location terminal 1220 that transmits and receives information about a usage time band of each shared unit 1210 for each vehicle 1300.

At the shared units 1210, the plurality of vehicles 1300 can simultaneously load and unload packages at the respective shared units 1210. The shared unit 1210 is, for example, a berth. Upon arrival at the delivery location 1200, the vehicle 1300 stops at one of the plurality of shared units 1210 of the delivery location 1200 where no other vehicle 1300 is parked, and a predetermined worker, forklift, or the like loads and unloads packages. Once the loading and unloading are complete, the vehicle 1300 leaves for the next delivery location 1200.

The logistics network management device 1100 is a computer having a communication function, and is managed by an administrator of the logistics network management system 100 or an administrator of the delivery location 1200, or the like. The logistics network management device 1100 has a function to calculate a usage time band of each shared unit 1210 of each delivery location 1200 used by each vehicle 1300 so as to reduce cargo waiting time of the entire logistics network, and notify the calculated usage time band.

The logistics network management device 1100, the location terminal 1220, and the vehicle terminal 1310 are connected communicably to each other by a wired or wireless communication network 1400 such as a local area network (LAN), a wide area network (WAN), the Internet, or a dedicated line.

The logistics network management device 1100 includes a storage device 1110 such as a random access memory (RAM), a read only memory (ROM), a hard disk drive (HDD), and a solid state drive (SSD), a computation device 1120 such as a central processing unit (CPU), an input device 1130 such as a keyboard, a mouse, and a touch panel, an output device 1140 such as a monitor (display), and a communication device 1150 that communicates with other devices. The location terminal 1220 and the vehicle terminal 1310 also have the same device configuration.

The storage device 1110 stores: delivery plan information 1111 that is information on the delivery locations 1200 that each vehicle 1300 passes through and on the delivery order of the vehicle 1300; shared unit usage time band information 1112 including information on the shared units 1210 held by the delivery locations 1200 and time band information about the usage of the shared units 1210 by the vehicle 1300; inter-location movement time information 1113 that is information on time required for the vehicle 1300 to move between the delivery locations 1200; expected arrival time information 1114 that is information on a time when the vehicle 1300 is expected to arrive at the delivery location 1200; recommended departure time information 1115 that is information on a time when the vehicle 1300 should leave the delivery location 1200; shared unit usage time band update proposal information 1116 that is information on the usage time band of the shared unit 1210 generated by the logistics network management device 1100; and shipping preparation progress information 1117 that is information on estimated completion time of shipping preparation for the vehicle 1300 at the delivery location 1200.

Delivery Plan Information

FIG. 2 is a diagram showing an example of the delivery plan information 1111. The delivery plan information 1111 includes a vehicle ID column 1111a, a location ID column 1111b of a delivery destination, and a delivery order column 1111c. The vehicle ID column 1111a stores information specifying a vehicle used for delivery. The location ID column 1111b stores information specifying a delivery location through which the delivery is routed. The delivery order column 1111c stores information indicating the order in which the vehicles pass through the delivery locations. For example, three records 1111e shown in FIG. 2 indicate that truck A delivers to warehouse 1, then to warehouse 2, and then to warehouse 3. The delivery plan information 1111 is updated by the administrator of the logistics network management system 100, for example.

Shared Unit Usage Time Band Information

FIG. 3 is a diagram showing an example of the shared unit usage time band information 1112. The shared unit usage time band information 1112 includes a vehicle ID column 1112a, a location ID column 1112b, a shared unit ID column 1112c, a shared unit usage start time column 1112d, and a shared unit usage end time column 1112e. The vehicle ID column 1112a stores information specifying a vehicle that uses a shared unit at the delivery location or the reason for using the shared unit. The location ID column 1112b stores information specifying a delivery location. The shared unit ID column 1112c stores information specifying a shared unit. The usage start time column 1112d and the usage end time column 1112e store times when the vehicle starts and ends the usage of the shared unit. For example, the first record 1112g indicates that truck A uses berth 1, which is a shared unit at warehouse 1, from 9:00 to 10:00 on August 1. The sixth record 1112h indicates that berth d at warehouse 3 is occupied from 0:00 to 20:00 on August 1 for a reason other than the usage by vehicles. The shared unit usage time band information 1112 is updated through processing performed by the logistics network management device 1100.

Inter-Location Movement Time Information

FIG. 4 is a diagram showing an example of the inter-location movement time information 1113. The inter-location movement time information 1113 includes a delivery origin location ID column 1113a, a delivery destination location ID column 1113b, and a movement time column 1113c. The delivery origin location ID column 1113a stores information specifying a delivery location from which a vehicle departs. The delivery destination location ID column 1113b stores information specifying a delivery location at which the vehicle arrives. The movement time column 1113c stores the time required to move from the delivery origin location 1113a to the delivery destination location 1113b. For example, the first record 1113e indicates that it takes 9 hours to move from warehouse 1 to warehouse 2. The inter-location movement time information 1113 is automatically updated by the administrator of the logistics network management system 100 or by a predetermined external information processing system, for example.

Note that the value in the movement time column 1113c is calculated based on, for example, positional information of each delivery location and traffic information (route information, congestion information, and the like) about roads between the respective delivery locations.

Expected Arrival Time Information

FIG. 5 is a diagram showing an example of the expected arrival time information 1114. The expected arrival time information 1114 includes a vehicle ID column 1114a, a location ID column 1114b, and an expected arrival time column 1114c. The vehicle ID column 1114a stores information specifying a vehicle. The location ID column 1114b stores information specifying a delivery location. The expected arrival time column 1114c stores a time when a vehicle specified in the vehicle ID column 1114a is expected to arrive at a delivery location specified in the location ID column 1114b. For example, the first record 1114e indicates that truck A is expected to arrive at warehouse 1 at 10:00 on August 1. The expected arrival time information 1114 is updated as needed by data exchange with the vehicle terminal 1310, for example.

Recommended Departure Time Information

FIG. 6 is a diagram showing an example of the recommended departure time information 1115. The recommended departure time information 1115 includes a vehicle ID column 1115a, a location ID column 1115b, and a recommended departure time column 1115c. The vehicle ID columns 1115a stores information specifying a vehicle. The location ID column 1115b stores information specifying a delivery location. The recommended departure time column 1115c stores a time when a vehicle specified in the vehicle ID column 1115a should leave a delivery location specified in the location ID column 1115b. For example, the first record 1115e indicates that truck A is recommended to leave warehouse 1 at 10:00 on August 1. The recommended departure time information 1115 is updated as needed by the administrator of the logistics network management system 100, for example.

Shared Unit Usage Time Band Update Proposal
Information

FIG. 7 is a diagram showing an example of the shared unit usage time band update proposal information 1116. The shared unit usage time band update proposal information 1116 is information for updating the shared unit usage time band information 1112. The shared unit usage time band update proposal information 1116 includes a vehicle ID column 1116a, a location ID column 1116b, a shared unit ID column 1116c, a shared unit usage start time column 1116d, and a shared unit usage end time column 1116e. The vehicle ID column 1116a stores a number that specifies a vehicle to be used for delivery. The location ID column 1116b stores information specifying a delivery location. The shared unit ID column 1116c stores information specifying a shared unit at a delivery location specified in the location ID column 1116b. The usage start time column 1116d and the usage end time column 1116e store a time when a vehicle specified in the vehicle ID column 1116a starts using a shared unit specified in the shared unit ID column 1116c and a time when the usage ends, respectively. For example, the first record 1116g indicates that a new usage time band is generated for truck A to use berth 1, which is a shared unit at warehouse 1, from 9:00 to 10:00 on August 1. The shared unit usage time band update proposal information 1116 is created through processing performed by the logistics network management device 1100.

Shipping Preparation Progress Information

FIG. 8 is a diagram showing an example of the shipping preparation progress information 1117. The shipping preparation progress information 1117 includes a vehicle ID column 1117a, a location ID column 1117b, and an expected shipping preparation completion time column 1117c. The vehicle ID column 1117a stores information specifying a vehicle. The location ID column 1117b stores information specifying a delivery location. The expected shipping preparation completion time column 1117c stores an expected time of completion of shipping preparation for a vehicle 1300 specified in the vehicle ID column 1117a at a delivery location specified in the location ID column 1117b. For example, the first record 1117e indicates that shipping preparation for truck A at warehouse 1 is expected to complete at 9:00 on August 1. The shipping preparation progress information 1117 is updated as needed by data exchange with the location terminal 1220, for example.

Next, referring back to FIG. 1, the storage device 1110 stores programs of a shared unit unassigned vehicle generation unit 1121, a recommended departure time calculation unit 1122, a shared unit usage time band generation unit 1123, a shared unit usage instruction generation unit 1124, an input unit 1125, and an output unit 1126.

The shared unit unassigned vehicle generation unit 1121 specifies a vehicle (hereinafter referred to as an unassigned vehicle) that arrives at a certain delivery location (hereinafter referred to as a target location) ahead of schedule or behind schedule.

The recommended departure time calculation unit 1122 specifies an arrival time as a recommended arrival time at the delivery destination location so as to minimize cargo waiting time at the delivery destination location, for each unassigned vehicle selected by the shared unit unassigned vehicle generation unit 1121, based on the expected arrival time at a delivery location (delivery destination location) at which the vehicle will arrive after an expected arrival at a delivery location (delivery origin location) and also based on information about vacant period of each shared unit at the delivery destination location, and the recommended departure time calculation unit 1122 calculates, based on the specified recommended arrival time, a recommended departure time that is a departure time from the delivery destination location.

For each unassigned vehicle, the shared unit usage time band generation unit 1123 determines whether or not the vehicle can arrive at a time when there is a shared unit available at the delivery origin location before the recommended departure time at the delivery origin location calculated by the recommended departure time calculation unit 1122. When it is determined that the vehicle can arrive at the time when there is a shared unit available, the shared unit usage time band generation unit 1123 generates information indicating that the vehicle should arrive at the stated time.

The shared unit usage instruction generation unit 1124 displays the information generated by the shared unit usage time band generation unit 1123 on a screen.

The input unit 1125 receives input from a warehouse manager. For example, the input unit 1125 receives an input of approval of the displayed shared unit usage time band proposal from a user of the logistics network management device 1100.

The output unit 1126 displays various kinds of information. For example, the output unit 1126 displays information on results of processing performed by the computation device 1120. For example, the output unit 1126 displays shared unit usage time band information.

Next, upon request of the logistics network management device 1100, the location terminal 1220 transmits the vehicle delivery plan information 1111, the shared unit usage time band information 1112, and the delivery inter-location movement time information 1113. The location terminal 1220 also receives the shared unit usage time band update proposal information 1116 and the shared unit usage time band information 1112 from the logistics network management device 1100 and displays the received information.

Upon request of the logistics network management device 1100, the vehicle terminal 1310 transmits the expected vehicle arrival time information 1114. The vehicle terminal 1310 also transmits the expected vehicle arrival time information 1114 to the logistics network management device 1100 based on input from a driver of the vehicle or the like. Further, the vehicle terminal 1310 receives the shared unit usage time band update proposal information 1116 and the shared unit usage time band information 1112 from the logistics network management device 1100 and displays the received information.

The functions of the logistics network management device 1100, the location terminal 1220, and the vehicle terminal 1310 described above are realized by hardware thereof, or by the computation device 1120 reading and executing each of the programs stored in the storage device 1110. These programs are stored, for example, in the storage device 1110 or another secondary storage device, or a non-transitory data storage medium readable by an information processing device, such as an IC card, an SD card, and a DVD.

Next, processing executed by the logistics management system 1 will be described.

Shared Unit Assignment Processing

FIG. 9 is a flowchart illustrating an example of processing of assigning a shared unit at each delivery location to each vehicle and instructing each vehicle to use the shared unit (shared unit assignment processing). This processing is started, for example, at a predetermined timing (for example, at a predetermined time or predetermined time intervals), or when there is a predetermined input from the administrator.

In this embodiment, it is assumed that a target delivery location (target location) for calculating the shared unit usage time band is specified as a trigger to start the shared unit assignment processing or at the start of the processing.

First, the shared unit unassigned vehicle generation unit 1121 of the logistics network management device 1100 executes shared unit unassigned vehicle generation processing, which is processing of generating an unassigned vehicle list by extracting, from among vehicles that use a target location, a vehicle (unassigned vehicle) for which a usage time band of the target location needs to be changed (step S1). This processing will be described in detail later.

Next, the recommended departure time calculation unit 1122 executes recommended departure time calculation processing of calculating, for each delivery location through which each unassigned vehicle in the unassigned vehicle list passes, a departure time (recommended departure time) from the delivery location with no cargo waiting time (step S2). The recommended departure time calculation unit 1122 stores each recommended departure time calculated in the recommended departure time information 1115. This processing will be described in detail later.

The shared unit usage time band generation unit 1123 executes shared unit usage time band generation processing, which is processing of assigning available shared units at the target location in order from an unassigned vehicle with the earliest recommended departure time from the target location (step S3). This processing will be described in detail later.

The shared unit usage time band generation unit 1123 determines whether or not there are any unassigned vehicles left, to which the shared unit usage time band generation processing has not been applied, among the unassigned vehicles which are currently scheduled to arrive at the target location (step S4).

When there are unassigned vehicles left (step S4: YES), the processing of step S2 is performed again for one of the remaining unassigned vehicles. On the other hand, when there are no unassigned vehicles left (step S4: NO), the processing of step S5 is performed.

In step S5, the shared unit usage instruction generation unit 1124 performs shared unit usage instruction generation processing of outputting information about the assignment of the shared units calculated in step S3 (the shared unit usage time band information 1112 and the like) to each device. This processing will be described in detail later.

The unassigned vehicle generation processing S1, the recommended departure time calculation processing S2, the shared unit usage time band generation processing S3, and the shared unit usage instruction generation processing S5 will be described in detail below.

Shared Unit Unassigned Vehicle Generation Processing

Figure 10:
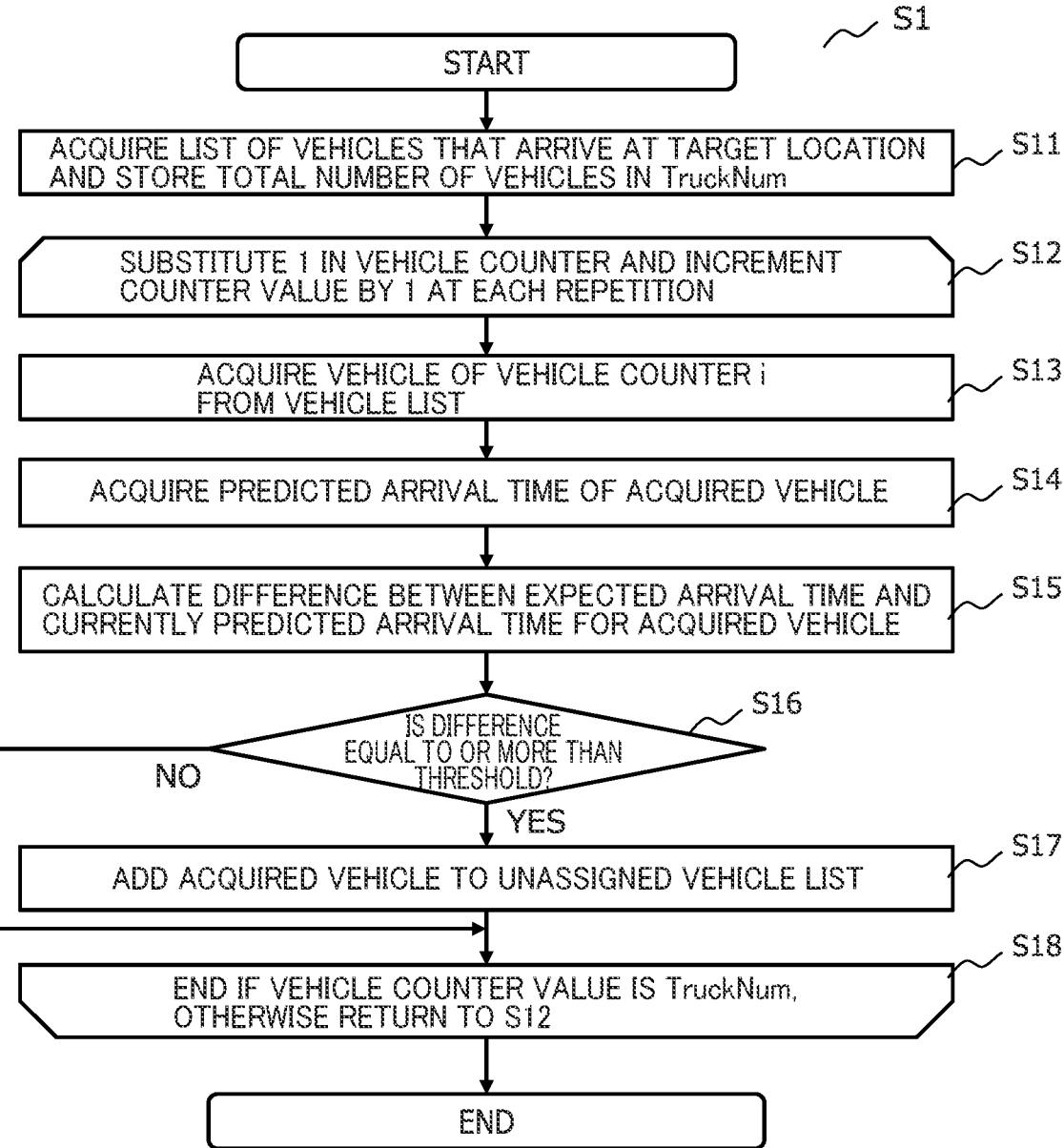
FIG. 10 is a flowchart illustrating details of shared unit unassigned vehicle generation processing.

FIG. 10 is a flowchart illustrating the details of the shared unit unassigned vehicle generation processing S1. The shared unit unassigned vehicle generation processing S1 is processing of calculating a difference between the initial expected arrival time and the current expected arrival time at the target location based on the shared unit usage time band information 1112 and the expected arrival time information 1114, and creating an unassigned vehicle list by extracting a vehicle for which the shared unit usage time band needs to be regenerated because the difference is large.

First, the shared unit unassigned vehicle generation unit 1121 specifies all vehicles scheduled to arrive at the target location and generates a full vehicle list (step S11).

To be more specific, the shared unit unassigned vehicle generation unit 1121 specifies all records in which the location ID of the target location is set in the location ID column 1111$b$ from the delivery plan information 1111, and acquires the vehicle ID column 1112$a$ for the specified records, thus specifying all the vehicles scheduled to arrive at the target location. Here, it is assumed that the shared unit unassigned vehicle generation unit 1121 stores the total number of vehicles specified in a variable TruckNum.

The shared unit unassigned vehicle generation unit 1121 also substitutes 1 in a vehicle counter i related to the unassigned vehicle list.

Then, the shared unit unassigned vehicle generation unit 1121 repeats the processing from step S13 to step S17 to be described later for each value of the vehicle counter i (step S12).

In step S13, the shared unit unassigned vehicle generation unit 1121 acquires a vehicle (vehicle i) corresponding to the vehicle counter i from the full vehicle list generated in step S11.

Then, the shared unit unassigned vehicle generation unit 1121 acquires an expected arrival time of the vehicle i (current expected arrival time) (step S14).

To be more specific, the shared unit unassigned vehicle generation unit 1121 specifies, from the expected arrival time information 1114, a record in which the ID of the vehicle i matches the value in the vehicle ID column 1114$a$ and the location ID of the target location matches the value in the location ID column 1114$b$, and acquires the expected arrival time column 1114$c$ for the specified record.

Thereafter, the shared unit unassigned vehicle generation unit 1121 calculates a difference between the scheduled arrival time and the current expected arrival time for the vehicle i (step S15).

To be more specific, the shared unit unassigned vehicle generation unit 1121 specifies, from the shared unit usage time band information 1112, a record in which the vehicle ID of the vehicle i matches the value in the vehicle ID column 1112$a$ and the location ID of the target location matches the value in the location ID column 1112$b$, and calculates an absolute value of a difference between the usage start time column 1112$d$ for the specified record and the expected arrival time acquired in step S14.

Then, the shared unit unassigned vehicle generation unit 1121 determines whether or not the difference in arrival time calculated in step S15 exceeds a preset threshold (step S16).

When the difference in arrival time exceeds the preset threshold (step S16: YES), the processing of step S17 is executed. On the other hand, when the difference in arrival time does not exceed the preset threshold (step S16: NO), the processing of step S18 is executed.

In step S17, the shared unit unassigned vehicle generation unit 1121 stores the vehicle i as one of the unassigned vehicles, and adds the vehicle i to the unassigned vehicle list.

In step S18, the shared unit unassigned vehicle generation unit 1121 determines whether or not the current value of the vehicle counter i is equal to TruckNum. When the current value of the vehicle counter i is equal to TruckNum, the shared unit unassigned vehicle generation unit 1121 terminates the shared unit unassigned vehicle generation processing S1. On the other hand, when the current value of the vehicle counter i is not equal to TruckNum, the shared unit unassigned vehicle generation unit 1121 increments the value of the vehicle counter i by 1, and repeats the processing from step S13.

Recommended Departure Time Calculation Processing

Figure 11:
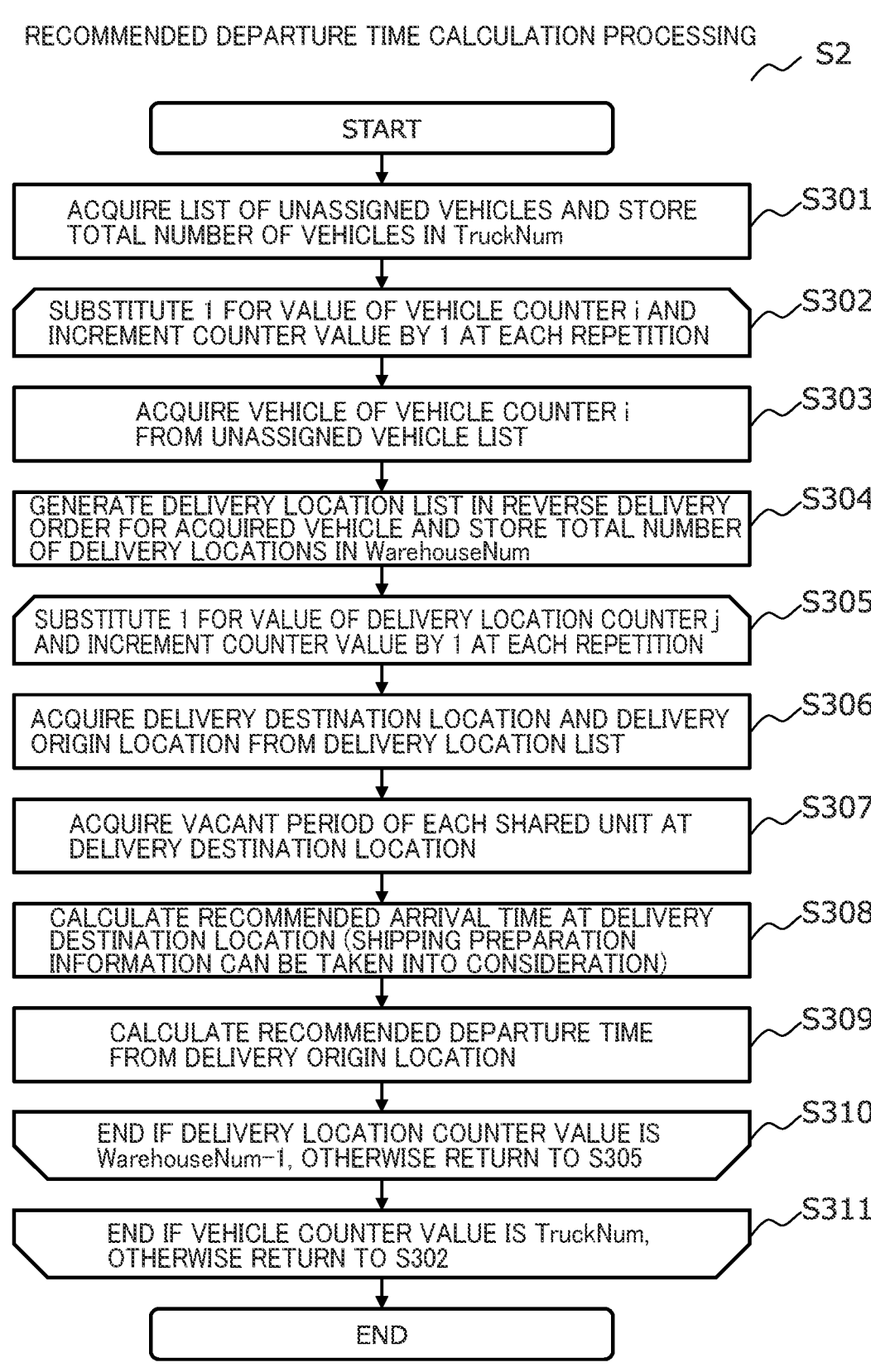
FIG. 11 is a flowchart illustrating details of recommended departure time calculation processing.

FIG. 11 is a flowchart illustrating the details of the recommended departure time calculation processing S2. The recommended departure time calculation processing is processing of calculating a departure time (recommended departure time) that minimizes cargo waiting time for each vehicle from each delivery location, based on the delivery plan information 1111, the shared unit usage time band information 1112, and the inter-location movement time information 1113, and storing the departure time thus determined in the recommended departure time information 1115.

The recommended departure time calculation unit 1122 acquires the unassigned vehicle list generated in the shared unit unassigned vehicle generation processing S1 (step S301). Here, it is assumed that the recommended departure time calculation unit 1122 stores the total number of vehicles in the unassigned vehicle list acquired in the variable TruckNum.

The recommended departure time calculation unit 1122 also substitutes 1 for the value of the vehicle counter i.

Then, the recommended departure time calculation unit 1122 repeats the processing from step S303 to step S311 to be described below for each value of the vehicle counter i in the unassigned vehicle list (step S302).

In step S303, the recommended departure time calculation unit 1122 specifies a vehicle (vehicle i) associated with the current vehicle counter i in the unassigned vehicle list.

The recommended departure time calculation unit 1122 acquires all delivery locations of the vehicle i to generate a delivery location list in which the acquired delivery locations are sorted in descending order of delivery (from the final destination to the point of origin) (step S304). Here, it is assumed that the recommended departure time calculation unit 1122 stores the total number of delivery locations in a variable WarehouseNum.

To be more specific, the recommended departure time calculation unit 1122 acquires all records in which the vehicle ID of the vehicle i matches the vehicle ID column 1111a from the delivery plan information 1111, and creates a list of the location ID columns 1111b sorted in descending order of the delivery order column 1111c by specifying the location ID column 1111b and the delivery order column 1111c of each of the records acquired.

Next, the recommended departure time calculation unit 1122 substitutes 1 for a value of a delivery location counter j in the delivery location list.

The recommended departure time calculation unit 1122 repeats the processing from step S306 to step S310 to be described below for each value of the delivery location counter j (step S305).

In step S306, the recommended departure time calculation unit 1122 acquires a delivery origin location when a location (delivery location j) related to the delivery location counter j for the vehicle i is set as a delivery destination location. To be more specific, the recommended departure time calculation unit 1122 acquires the delivery location j as the delivery destination location and a location immediately before the delivery location j as the delivery origin location based on the delivery location list.

Then, the recommended departure time calculation unit 1122 acquires a vacant period of each shared unit at the delivery destination location (step S307). To be more specific, the recommended departure time calculation unit 1122 specifies all records in which the location ID of the delivery destination location matches the value in the location ID column 1112b from the shared unit usage time band information 1112, and calculates a vacant period of each shared unit from the usage start time column 1112d and the usage end time column 1112e in each of the records specified.

The recommended departure time calculation unit 1122 also calculates a recommended arrival time at the delivery destination location (arrival time at the delivery destination location for which the period from arrival at the delivery destination location until the start of loading/unloading is shortest) (step S308).

To be more specific, the recommended departure time calculation unit 1122 first attempts to acquire, from the recommended departure time information 1115, the recommended departure time column 1115c for a record in which the delivery destination location is stored in the location ID column 1115b. When the recommended departure time column 1115c can be acquired, the recommended departure time calculation unit 1122 compares a time (expected arrival time) obtained by subtracting an operation time (calculated by the shipping preparation progress information 1117) at the delivery destination location from the time indicated in the acquired recommended departure time column 1115c with the earliest start time among the start times of the vacant period of each shared unit acquired in step S307, and sets the later time as the recommended arrival time. When the recommended departure time cannot be acquired from the recommended departure time column 1115c, the recommended departure time calculation unit 1122 sets the earliest start time among the start times of the vacant period of each shared unit acquired in step S307 as the recommended arrival time.

Note that the recommended departure time calculation unit 1122 may acquire the operation time, for example, from a predetermined database or from an output result of a predetermined time prediction model.

Then, the recommended departure time calculation unit 1122 calculates the recommended departure time from the delivery origin location based on the recommended arrival time at the delivery destination location calculated in step S308 and the movement time from the delivery origin location to the delivery destination location, and stores the recommended departure time thus calculated in the recommended departure time information 1115 (step S309).

To be more specific, the recommended departure time calculation unit 1122 first specifies, from the delivery inter-location movement time information 1113, a record in which the value in the delivery origin location ID column 1113a matches the ID of the delivery origin location and the value in the delivery destination location ID column 1113b matches the ID of the delivery destination location, and acquires the movement time column 1113c for the specified record, thus calculating the movement time. Then, the recommended departure time calculation unit 1122 sets a value obtained by subtracting the movement time from the recommended arrival time at the delivery destination location calculated in step S308 as the recommended departure time. The recommended departure time calculation unit 1122 sets the calculated recommended departure time in the recommended departure time column 1115c of the record related to the vehicle i and the delivery origin location acquired in step S306 in the recommended departure time information 1115.

Then, in step S310, the recommended departure time calculation unit 1122 determines whether or not the current value of the delivery location counter j is equal to WarehouseNum−1. When the value of the delivery location counter j is equal to WarehouseNum−1, the recommended departure time calculation unit 1122 executes the processing of step S311. On the other hand, when the value of the delivery location counter j is not equal to WarehouseNum−1, the recommended departure time calculation unit 1122 increments the value of the delivery location counter j by 1 and repeats the processing from step S305.

Then, in step S311, the recommended departure time calculation unit 1122 determines whether or not the current value of the vehicle counter i is equal to TruckNum. When the current value of the vehicle counter i is equal to TruckNum, the recommended departure time calculation unit 1122 terminates the recommended departure time calculation processing S2. On the other hand, when the current value of the vehicle counter i is not equal to TruckNum, the recommended departure time calculation unit 1122 increments the value of the vehicle counter i by 1 and repeats the processing from step S302.

Shared Unit Usage Time Band Generation Processing

Figure 12:
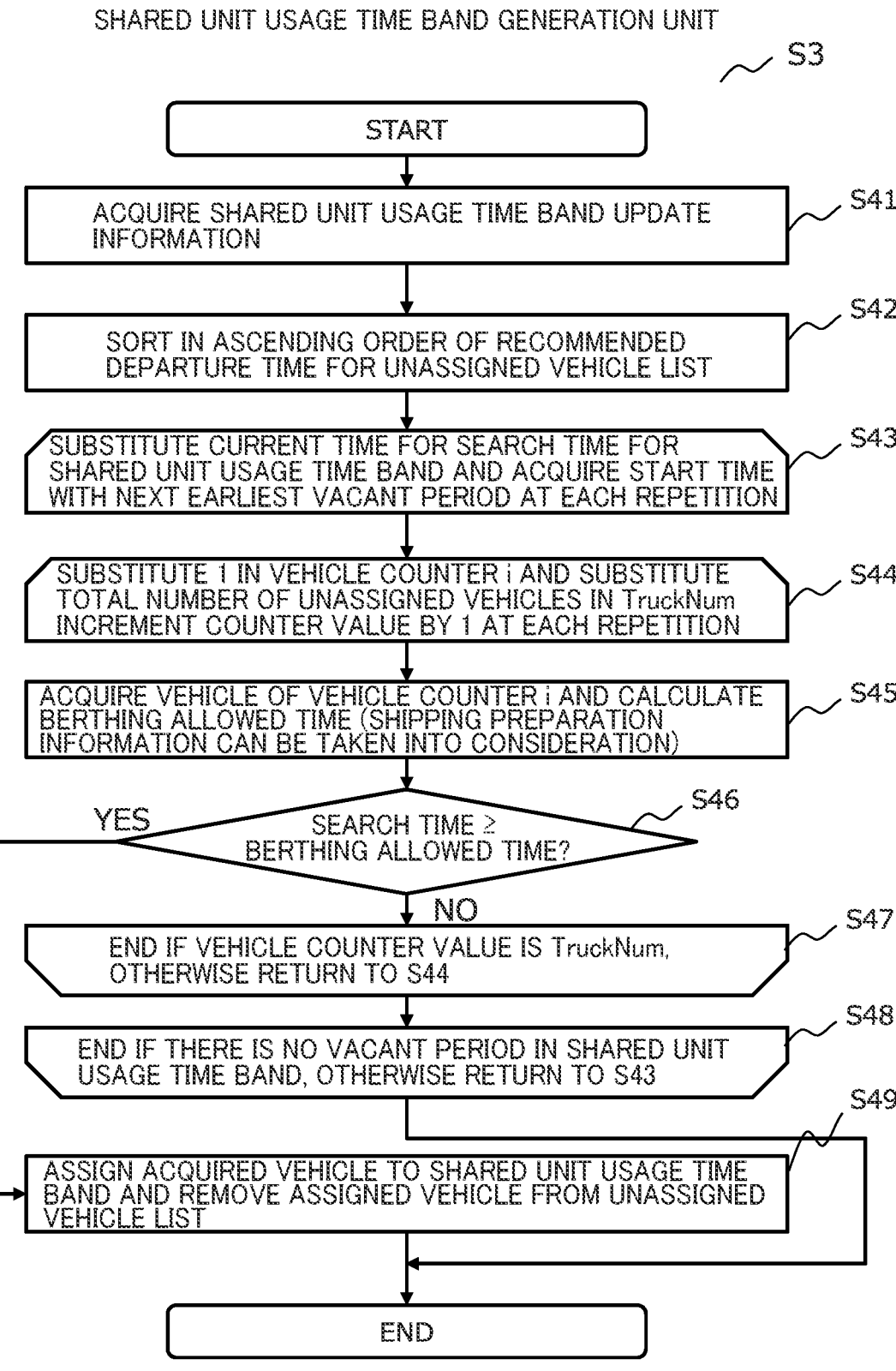
FIG. 12 is a flowchart illustrating details of shared unit usage time band generation processing.

FIG. 12 is a flowchart illustrating the details of the shared unit usage time band generation processing S3. In this processing, based on the recommended departure time information 1115 generated in the recommended departure time calculation processing and the expected arrival time information 1114, shared units with vacant early time bands are assigned in order from unassigned vehicles having earlier recommended departure times, and the result thereof is stored in the shared unit usage time band update proposal information 1116.

First, the shared unit usage time band generation unit 1123 acquires current shared unit usage time band update proposal information 1116 (step S41).

The shared unit usage time band generation unit 1123 sorts the vehicles in the unassigned vehicle list in ascending order of recommended departure time calculated in the recommended departure time calculation processing (in order from the earliest recommended departure time) (step S42).

Then, the shared unit usage time band generation unit 1123 substitutes the current time in a variable representing a search time for the shared unit usage time band at the target location (hereinafter simply referred to as the search time). This search time is the time for searching for the start time of a vacant period in the shared unit after the current time. Then, the shared unit usage time band generation unit 1123 repeats the processing from step S44 to step S48 to be described later for the search time (step S43).

In step S48, the shared unit usage time band generation unit 1123 substitutes 1 in the vehicle counter i in the unassigned vehicle list. Note that, here, the shared unit usage time band generation unit 1123 substitutes the number of elements in the unassigned vehicle list for TruckNum.

The shared unit usage time band generation unit 1123 repeats the processing from step S45 to step S47 to be described later for the vehicle counter i.

In step S45, the shared unit usage time band generation unit 1123 acquires an unassigned vehicle (vehicle i) related to the vehicle counter i, and calculates a berthing allowed time at the target location for the vehicle i (berthing allowed time for the vehicle i without taking into account the availability of shared units at the target location).

In this embodiment, the shared unit usage time band generation unit 1123 acquires, from the expected arrival time information 1114, the expected arrival time column 1114c of the record in which the ID of the vehicle i is stored in the vehicle ID column 1114a. Thus, the expected arrival time of the vehicle i is specified, and the expected arrival time thus specified is set as the berthing allowed time.

In this event, the shared unit usage time band generation unit 1123 may calculate the berthing allowed time by taking into account the time required for a shipping operation at the delivery location based on the shipping preparation progress information 1117. For example, the shared unit usage time band generation unit 1123 acquires the expected shipping preparation completion time column 1117c of the record related to the vehicle i and the target location in the shipping preparation progress information 1117, and sets this time as the berthing allowed time.

Next, the shared unit usage time band generation unit 1123 determines whether or not the berthing allowed time calculated in step S45 is earlier than the available time (search time) set in step S43 (step S46).

When the berthing allowed time is earlier than the available time (step S46: YES), the shared unit usage time band generation unit 1123 determines that the shared unit with the search time as the start time of the vacant period can be assigned to the vehicle i and executes the processing of step S49. On the other hand, when the berthing allowed time is not earlier than the available time (step S46: NO), the shared unit usage time band generation unit 1123 executes the processing of step S47.

In step S47, the shared unit usage time band generation unit 1123 determines whether or not the value of the vehicle counter i is equal to TruckNum. When the value of the vehicle counter i is equal to TruckNum, step S48 is executed. On the other hand, when the value of the vehicle counter i is not equal to TruckNum, the value of the vehicle counter i is increased by 1 and the processing of step S44 is repeated.

In step S48, the shared unit usage time band generation unit 1123 determines whether or not there is a shared unit at the target location, for which the vacant period starts later than the current search time. When there is such a shared unit, the shared unit usage time band generation unit 1123 sets the start time of the vacant period for the shared unit as a new search time, and repeats the processing from step S43. On the other hand, when there is no such shared unit, the shared unit usage time band generation unit 1123 outputs error information indicating that assignment to the vehicle i is not possible, and then terminates the shared unit usage time band generation processing S3.

On the other hand, in step S49, the shared unit usage time band generation unit 1123 assigns the vehicle i acquired in step S45 to the shared unit available time band having the start time of the vacant period related to the search time calculated in step S43. Note that the shared unit usage time band generation unit 1123 removes the vehicle i from the unassigned vehicle list.

To be more specific, the shared unit usage time band generation unit 1123 sets the search time and the time after completion of shipping preparation in the usage start time column 1116d and the usage end time column 1116e of the record related to the vehicle i and the target location in the shared unit usage time band update proposal information 1116.

Thus, it is made possible for the vehicle to arrive at the shared unit where the vacant period comes as early as possible from the current time.

Shared Unit Usage Instruction Generation Processing

Figure 13:
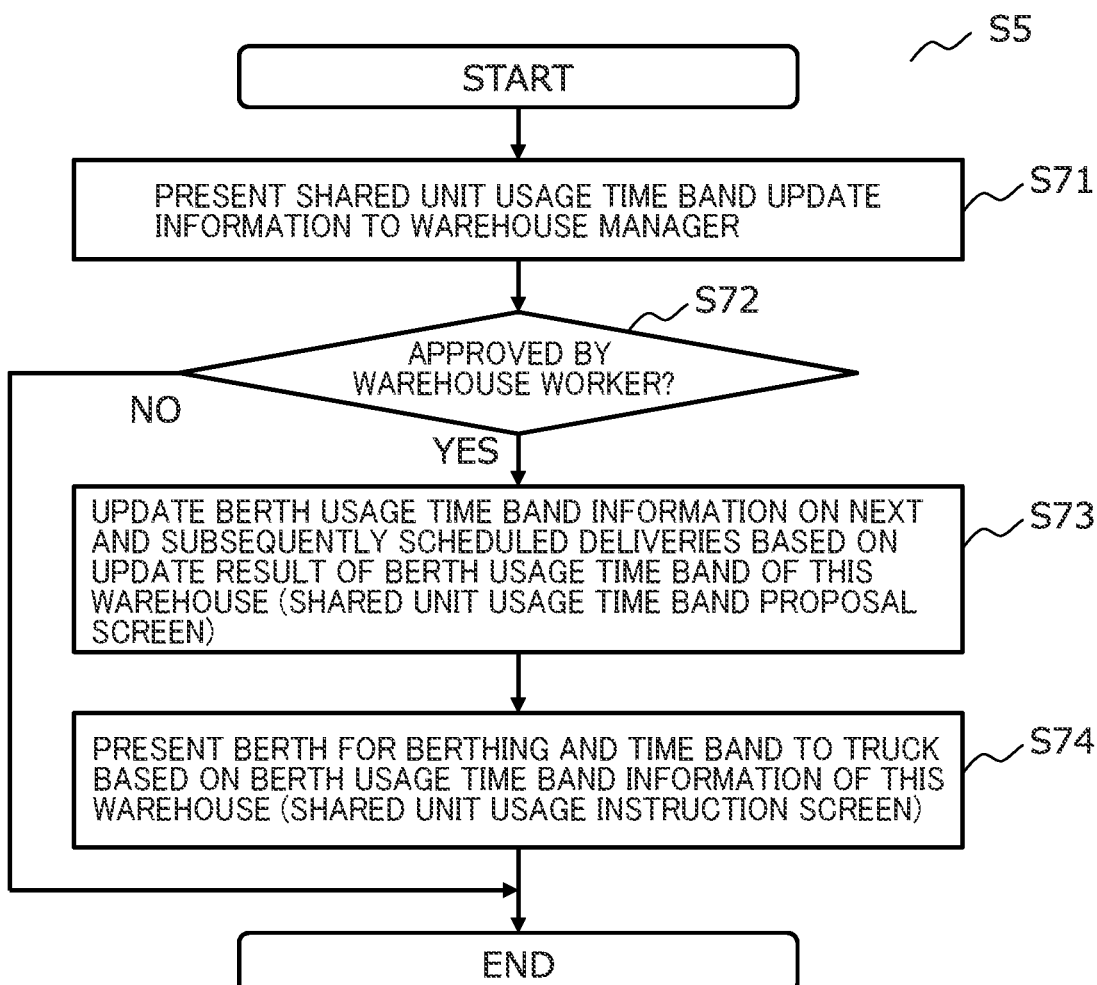
FIG. 13 is a flowchart illustrating details of shared unit usage instruction generation processing.

FIG. 13 is a flowchart illustrating the details of the shared unit usage instruction generation processing S5.

First, the shared unit usage instruction generation unit 1124 displays a screen (shared unit usage time band proposal screen) that presents a shared unit usage time band proposal to the warehouse manager at the target location (step S71).

Figure 14:
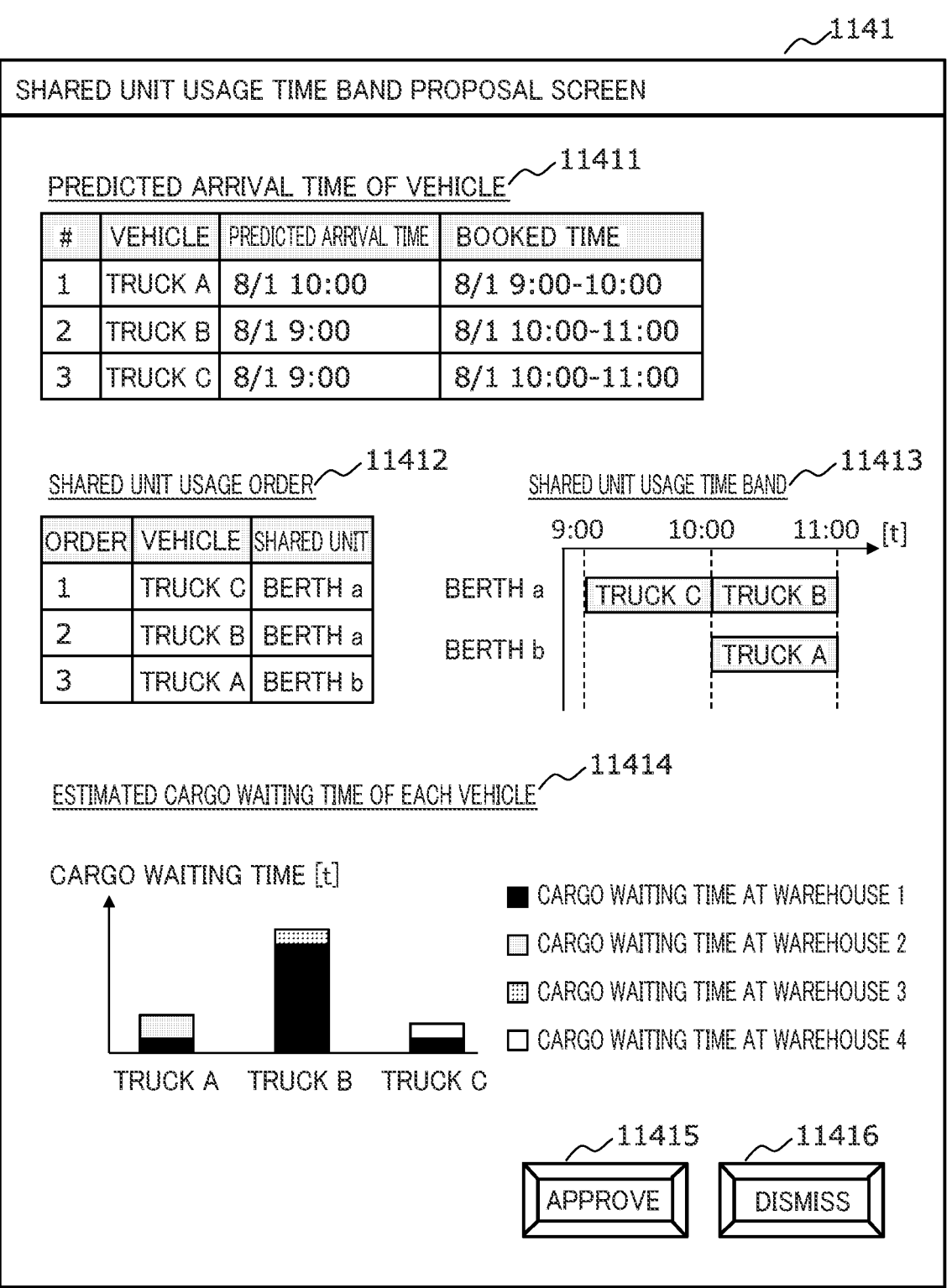
FIG. 14 is a diagram showing an example of a shared unit usage time band proposal screen.

FIG. 14 is a diagram showing an example of a shared unit usage time band proposal screen 1141. The shared unit usage time band proposal screen 1141 displays information (specifically, shared unit usage time band update proposal information 1116) on the shared unit usage time band at the target location calculated by the shared unit usage time band generation processing S3.

More specifically, the shared unit usage time band proposal screen 1141 includes: a predicted arrival time field 11411 presenting a predicted arrival time of each vehicle at the target location and a booking time band for the shared unit at the target location; a usage time band field 11412 presenting a proposal of the usage order of the shared units at the target location (the order in which each vehicle uses each shared unit); a call order field 11413 showing a proposal of the usage order of each vehicle in each shared unit at the target location; an estimated cargo waiting time field 11414 presenting the cargo waiting time of each vehicle for each delivery location; an approval button 11415 for receiving, from the warehouse manager, input of approval of the proposal content (for example, the usage order of each vehicle in each shared unit) currently displayed on the shared unit usage time band proposal screen 1141; and a dismissal button 11416 for receiving input of disapproval of the content from the warehouse manager.

Next, as shown in step S72 in FIG. 13, the shared unit usage instruction generation unit 1124 receives approval of the shared unit usage time band update proposal information 1116 from the warehouse manager. To be more specific, the shared unit usage instruction generation unit 1124 receives pressing of the approval button 11415 or the dismissal button 11416 on the shared unit usage time band proposal screen 1141.

When the approval button 11415 is pressed (step S72: YES), the shared unit usage instruction generation unit 1124 executes the processing of step S73. On the other hand, when the dismissal button 11416 is pressed (step S72: NO), the shared unit usage instruction generation unit 1124 terminates the shared unit usage instruction generation processing S5.

In step S73, the shared unit usage instruction generation unit 1124 updates the shared unit usage time band information 1112 with the contents of the shared unit usage time band update proposal information 1116.

Then, based on the updated shared unit usage time band information 1112, the shared unit usage instruction generation unit 1124 transmits to each vehicle a screen (shared unit usage instruction screen 1142) for instructing each vehicle to use the shared unit and the usage time band thereof at the target location calculated by the shared unit usage time band generation processing S5 (step S74), and the vehicle terminal 1310 of each vehicle displays this screen.

Accordingly, the driver of each vehicle can make a delivery based on the shared unit and the usage time band thereof displayed on the shared unit usage instruction screen 1142.

Shared Unit Usage Instruction Screen

Figure 15:
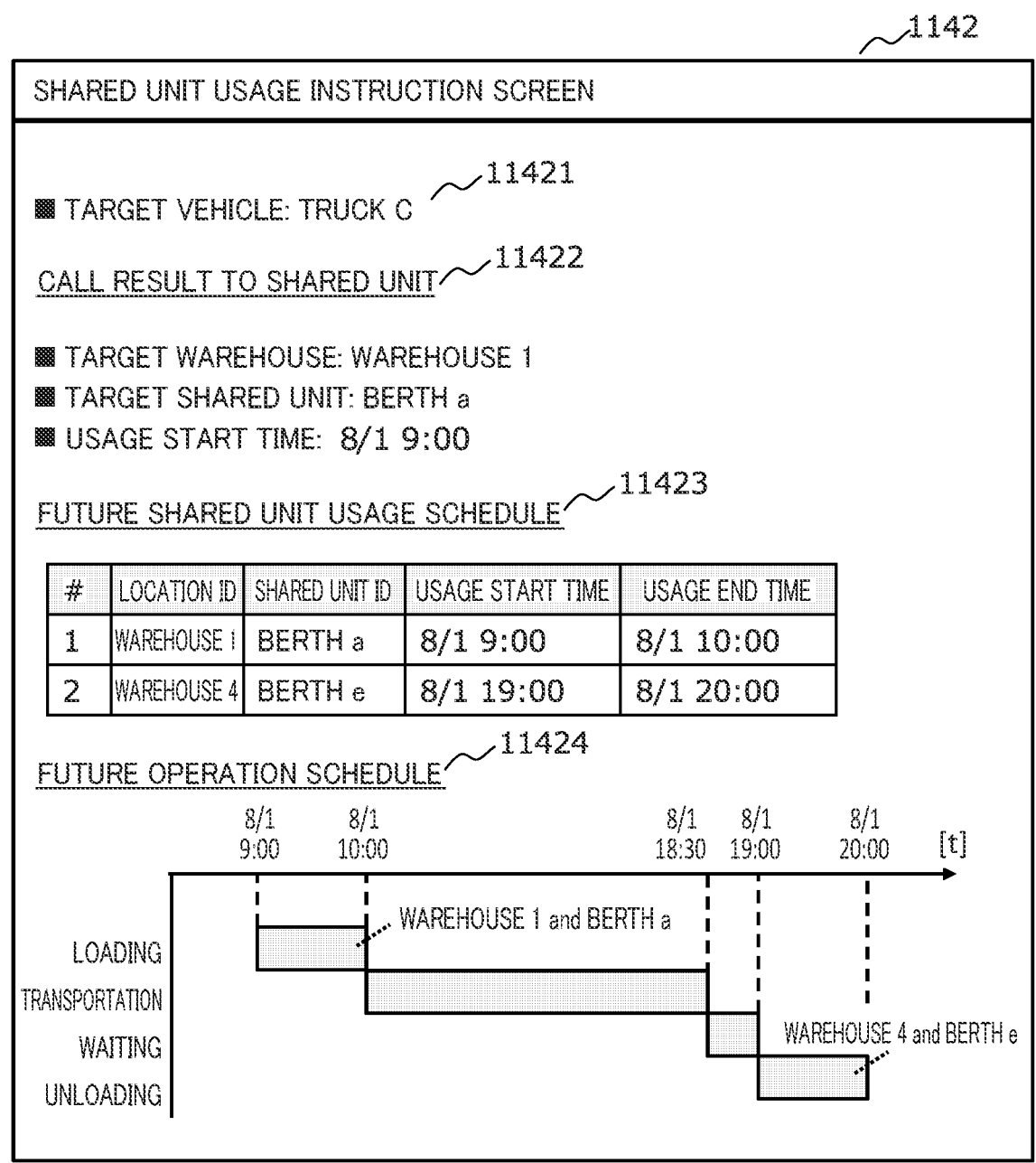
FIG. 15 is a diagram showing an example of a shared unit usage instruction screen.

FIG. 15 is a diagram showing an example of the shared unit usage instruction screen 1142. The shared unit usage instruction screen 1142 includes: a target vehicle field 11421 for selecting a vehicle (target vehicle) to which a usage instruction is to be sent; a call result field 11422 presenting the shared unit and the usage start time thereof at the target location to be used by the target vehicle; a shared unit usage schedule field 11423 presenting a shared unit to be used and scheduled usage time at each delivery location for the target vehicle at or after the usage time; and an operation schedule field 11424 showing a transportation schedule including the content of the shared unit usage schedule field 11423.

As described above, the logistics network management device 1100 of this embodiment calculates, for each unassigned vehicle, based on the expected arrival time at the delivery destination location (expected arrival time information 1114) and information (shared unit usage time band information 1112) about a vacant period of each shared unit at the delivery destination location, a recommended arrival time that is an arrival time at the delivery destination location for which the cargo waiting time from arrival at the delivery destination location is shortest, calculates a recommended departure time from the delivery origin location based on the calculated recommended arrival time, and when each unassigned vehicle can arrive at a shared unit that can be used at the delivery origin location at a time at or before the recommended departure time from the delivery origin location, displays the shared unit usage time band proposal screen 1141 indicating that the vehicle should arrive at the stated time at the shared unit that can be used.

More specifically, the logistics network management device 1100 of this embodiment determines the departure time from the delivery origin location based on the start time of the vacant period of the vehicle at each shared unit at the delivery location (delivery destination location) after the delivery origin location at which the vehicle is current scheduled to arrive. Therefore, it is possible to reduce the standby time (such as cargo waiting time) at the delivery destination location, taking into consideration future situations of the delivery location.

Thus, according to the logistics network management device 1100 of this embodiment, when a plurality of vehicles make deliveries via a plurality of delivery locations having a plurality of shared units, the standby time of each vehicle at the delivery location can be reduced.

For example, when the arrival of a vehicle at a certain delivery location is earlier or later than originally expected, the total cargo waiting time at the subsequent delivery locations can be reduced. As a result, the effects of improving the work environment of vehicle drivers, improving delivery efficiency, and reducing the environmental load are achieved.

The present invention is not limited to the embodiment described above, and includes various modifications. The above embodiment has been described in detail for better understanding of the present invention, and is not necessarily limited to those having all the configurations described.

For example, in this embodiment, the delivery location and its shared units are warehouses and berths, respectively.

However, any type of facilities can be used as long as it is possible for a plurality of vehicles to unload packages.

Further, in this embodiment, the processing of the logistics network management device 1100 has been described assuming that the target location is specified in advance. The target location may be specified by the administrator or the like, or the logistics network management device 1100 may automatically select an arbitrary target location.

Further, the method of calculating the recommended arrival time in the recommended departure time calculation processing S2 is not limited to that described in this embodiment. For example, the recommended arrival time may be adjusted to an earlier or later time according to the structure of the delivery location, the type of vehicle, the type of package, and the like.

At least the following matters are clarified by the above description of the present specification. That is, in the present embodiment, the computation device of the logistics network management device 1100 may transmit the generated information to a vehicle related to the information in the usage instruction generation processing.

Thus, a driver of a vehicle that makes a delivery through each delivery location can make deliveries with less cargo waiting time.

Further, in the present embodiment, the computation device of the logistics network management device 1100 may calculate, in the recommended departure time calculation processing, the recommended departure time based on the calculated recommended arrival time, positional information on the first and the second delivery locations, and traffic information between the first and the second delivery locations.

Thus, by calculating the recommended departure time from the delivery origin location based on the positional information on the delivery origin location and the delivery destination location and the traffic information between the delivery origin location and the delivery destination location, accurate recommended departure time can be calculated according to traffic situations.

Further, in the present embodiment, the computation device of the logistics network management device 1100 may calculate, in the recommended departure time calculation processing, the recommended arrival time based on the time required for shipping preparation of each vehicle in each shared unit at the second delivery location.

Thus, by calculating the recommended arrival time at the delivery destination location based on the time required for shipping preparation of each vehicle in each shared unit at the delivery destination location, accurate recommended arrival time can be calculated according to operation progress at the delivery destination location.

Further, in the present embodiment, the computation device of the logistics network management device 1100 may determine, in the shared unit usage time band generation processing, whether or not each vehicle can arrive at a shared unit that can be used at the first delivery location at a time at or before the calculated recommended departure time based on the time required for shipping preparation of each vehicle in each shared unit at the first delivery location.

Thus, by determining whether or not it is possible to arrive at a vacant shared unit at the delivery origin location based on the time required for shipping preparation of each vehicle in each shared unit at the delivery origin location, the arrival time can be calculated according to the operation progress at the delivery origin location.

Further, in the present embodiment, the computation device of the logistics network management device 1100 may execute shared unit unassigned vehicle generation processing of selecting each vehicle based on the positional information on each delivery location and the traffic information between the delivery locations.

Thus, by selecting each unassigned vehicle based on the positional information on each delivery location and the traffic information between the delivery locations, the departure and arrival times of an appropriate vehicle from and at the delivery location can be changed at appropriate timing.

Further, in the present embodiment, the logistics network management system 100 may further comprise: a vehicle terminal configured to display information received from the logistics network management device.

Thus, the driver of each vehicle or the like can know the departure and arrival times from and at the delivery location and the like at the appropriate timing.

REFERENCE SIGNS LIST

100 logistics network management system
1100 logistics network management device
1200 delivery location
1300 vehicle
1310 vehicle terminal
1210 shared unit
1220 location terminal

The invention claimed is:

1. A logistics network management device configured to manage a logistics network in which a plurality of vehicles make deliveries via a plurality of delivery locations having a plurality of shared units, comprising:

a memory storing a program;

a computation device configured to execute the program, which causes the computation device to execute recommended departure time calculation processing of calculating, for each selected vehicle, based on an expected arrival time at a second delivery location at which the vehicle will arrive after an expected arrival at a first delivery location and also based on information about a vacant period of each shared unit at the second delivery location, a recommended arrival time at the second delivery location for which a period from arrival at the second delivery location until the start of a predetermined operation is shortest, and calculating, based on the recommended arrival time, a recommended departure time that is a departure time from the first delivery location, shared unit usage time band generation processing of determining, for each vehicle, whether or not the vehicle can arrive at a shared unit that can be used at the first delivery location at a stated time at or before the recommended departure time, and generating, when it is determined that the vehicle can arrive at the shared unit that can be used, information indicating that the vehicle should arrive at the stated time at the shared unit that can be used at the first delivery location, and usage instruction generation processing of displaying the generated information on a screen configured for viewing by a user of the logistics network management device, and receiving an input, from the user of the logistics network management device, which approves or dismisses the generated information, wherein, when the input approves the generated information, the logistics network management device outputs an instruction to each vehicle to use the shared unit and a usage time band thereof at the plurality of delivery locations, and when the input dismisses the generated information, the logistics network management device terminates the shared unit usage time band generation processing, and wherein the deliveries are made by the plurality of vehicles based on the instruction, such that an environmental impact of each vehicle at the plurality of delivery locations is reduced; and a screen configured to automatically create and display information on use of one of the shared units and a button for choosing approval or rejection of the information in a location terminal of a warehouse manager.

2. The logistics network management device according to claim 1, wherein the computation device transmits the generated information to a vehicle related to the information in the usage instruction generation processing.

3. The logistics network management device according to claim 1, wherein the computation device calculates, in the recommended departure time calculation processing, the recommended departure time based on the recommended arrival time, positional information on the first and the second delivery locations, and traffic information between the first and the second delivery locations.

4. The logistics network management device according to claim 1, wherein the computation device calculates, in the recommended departure time calculation processing, the recommended arrival time at the second delivery location based on the time required for shipping preparation of each vehicle in each shared unit at the second delivery location.

5. The logistics network management device according to claim 1, wherein the computation device determines, in the shared unit usage time band generation processing, whether or not each vehicle can arrive at a shared unit that can be used at the first delivery location at a time at or before the recommended departure time based on the time required for shipping preparation of each vehicle in each shared unit at the first delivery location.

6. The logistics network management device according to claim 1, wherein the computation device executes shared unit unassigned vehicle generation processing of calculating an arrival time of each vehicle at the first delivery location from the positional information on each delivery location and the traffic information between the delivery locations, and selecting each vehicle based on the arrival time.

7. The logistics network management device according to claim 1, wherein a cargo waiting time for the vehicles for each delivery point is displayed on the screen for the warehouse manager.

8. A logistics network management system configured to manage a logistics network in which a plurality of vehicles make deliveries via a plurality of delivery locations having a plurality of shared units, comprising:

a memory storing a program; and a computation device configured to execute the program, which causes the computation device to execute recommended departure time calculation processing of calculating, for each selected vehicle, based on an expected arrival time at a second delivery location at which the vehicle will arrive after an expected arrival at a first delivery location and also based on information about a vacant period of each shared unit at the second delivery location, a recommended arrival time at the second delivery location for which a period from arrival at the second delivery location until the start of a predetermined operation is shortest, and calculating, based on the recommended arrival time, a recommended departure time that is a departure time from the first delivery location, shared unit usage time band generation processing of determining, for each vehicle, whether or not the vehicle can arrive at a shared unit that can be used at the first delivery location at a stated time at or before the recommended departure time, and generating, when it is determined that the vehicle can arrive at the shared unit that can be used, information indicating that the vehicle should arrive at the stated time at the shared unit that can be used at the first delivery location, and usage instruction generation processing of displaying the generated information on a screen configured for viewing by a user of the logistics network management device;

a logistics network management device configured to transmit the generated information in the usage instruction generation processing; and a location terminal configured to automatically create and display information received from the logistics network management device and provided at the first delivery location on a screen of a warehouse manager, the information including an indication of use of one of the shared units and a button for choosing approval or rejection of the information;

wherein the computation device is configured to receive an input, from the user of the logistics network management device, which approves or dismisses the generated information, wherein, when the input approves the generated information, the logistics network management device outputs an instruction to each vehicle to use the shared unit and a usage time band thereof at the plurality of delivery locations, and when the input dismisses the generated information, the logistics network management device terminates the shared unit usage time band generation processing, and wherein the deliveries are made by the plurality of vehicles based on the instruction, such that an environmental impact of each vehicle at the plurality of delivery locations is reduced.

9. The logistics network management system according to claim 8, further comprising:

a vehicle terminal configured to display information received from the logistics network management device.

10. A logistics network management method for managing a logistics network in which a plurality of vehicles make deliveries via a plurality of delivery locations having a plurality of shared units, wherein an information processing device executes recommended departure time calculation processing of calculating, for each selected vehicle, based on an expected arrival time at a second delivery location at which the vehicle will arrive after an expected arrival at a first delivery location and also based on information about a vacant period of each shared unit at the second delivery location, a recommended arrival time at the second delivery location for which a period from arrival at the second delivery location until the start of a predetermined operation is shortest, and calculating, based on the recommended arrival time, a recommended departure time that is a departure time from the first delivery location, shared unit usage time band generation processing of determining, for each vehicle, whether or not the vehicle can arrive at a shared unit that can be used at the first delivery location at a stated time at or before the recommended departure time, and generating, when it is determined that the vehicle can arrive at the shared unit that can be used, information indicating that the vehicle should arrive at the stated time at the shared unit that can be used at the first delivery location, and usage instruction generation processing of automatically creating and displaying the generated information on a location terminal of a warehouse manager including a screen configured for viewing by a user of the logistics network management device, and receiving an input, from the user of the logistics network management device, which approves or dismisses the generated information, wherein, when the input approves the generated information, the logistics network management device outputs an instruction to each vehicle to use the shared unit and a usage time band thereof at the plurality of delivery locations, and when the input dismisses the generated information, the logistics network management device terminates the shared unit usage time band generation processing, and wherein the deliveries are made by the plurality of vehicles based on the instruction, such that an environmental impact of each vehicle at the plurality of delivery locations is reduced, and wherein the generated information includes information on use of one of the shared units and a button for choosing approval or rejection of the information.

11. The logistics network management device according to claim 7, wherein information on the cargo waiting time for each delivery point is displayed as a stacked graph stacking the cargo waiting time at each warehouse on a vertical axis.

12. The logistics network management device according to claim 7, wherein the cargo waiting time for each of the plurality of vehicles is displayed on a horizontal axis on the screen for the warehouse manager.

13. The logistics network management device according to claim 7, wherein information consolidating instructions for using the shared unit for each of a plurality of locations is automatically generated and displayed on a screen for a driver on the vehicle terminal.

14. The logistics network management device according to claim 13, wherein information on an operation schedule illustrating a delivery schedule including a shared usage instruction for each of a plurality of locations is displayed on the screen for the driver.

15. The logistics network management device according to claim 14, wherein the delivery schedule is displayed by a Gantt chart with time on a horizontal axis and work content on a vertical axis.

* * * * *